Feb. 10, 1970 YASUHIRO UEMURA 3,494,572

TAPE MAGAZINE LOADING DEVICE

Filed Sept. 18, 1968 2 Sheets-Sheet 1

Feb. 10, 1970 YASUHIRO UEMURA 3,494,572

TAPE MAGAZINE LOADING DEVICE

Filed Sept. 18, 1968 2 Sheets-Sheet 2

United States Patent Office 3,494,572

Patented Feb. 10, 1970

3,494,572

TAPE MAGAZINE LOADING DEVICE

Yasuhiro Uemura, Tokyo, Japan, assignor to Teac Corporation, Tokyo, Japan

Filed Sept. 18, 1968, Ser. No. 760,453
Claims priority, application Japan, Oct. 2, 1967, 42/83,691
Int. Cl. G11b 23/04
U.S. Cl. 242—198 1 Claim

ABSTRACT OF THE DISCLOSURE

A tape magazine loading device, wherein a slide plate having a tape magazine thereon is automatically moved from an upper position to a lower position so that the tape magazine is brought to an operational position. The slide plate assuming the lower position is moved to the upper position by lever means with the tape magazine resting thereon, and the tape magazine is automatically pushed sidewise upon arrival of the slide plate at the upper position.

This invention relates to a tape magazine loading device, and more particularly it pertains to a mechanism for facilitating the loading and unloading of a tape magazine.

There have heretofore been proposed a variety of tape magazine loading devices. With such conventional devices, however, some trouble is encountered in the loading of a tape magazine, and the smooth removal of the loaded tape magazine cannot easily be achieved.

Accordingly, it is a primary object of the present invention to provide a tape magazine loading device adapted for facilitating the loading of a tape magazine.

Another object of the present invention is to provide a tape magazine loading device adapted for facilitating the smooth unloading or removal of a loaded or inserted tape magazine.

These objects of the present invention may be accomplished in a device wherein a tape magazine is automatically brought to an operational position merely by being placed in parallel with a base plate without requiring any prior and subsequent operations, so that the tape may be transported in engagement with a magnetic head.

Other objects, features and advantages of the present invention will become apparent from the following description taken in conjunction with the accompanying drawings, in which.

Figure 1:
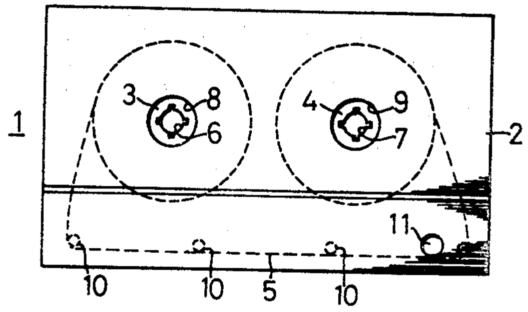
FIGURE 1 is a plan view showing an example of tape magazine capable of being loaded in the tape magazine loading device embodying the present invention.
Figure 2:
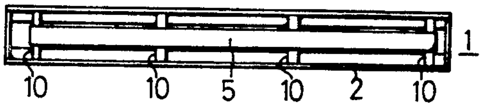
FIGURE 2 is a front view showing the tape magazine of FIGURE 1.
Figure 3:
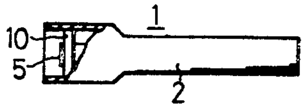
FIGURE 3 is a side view, partly in section, showing the tape magazine of FIGURE 1.
Figure 5:
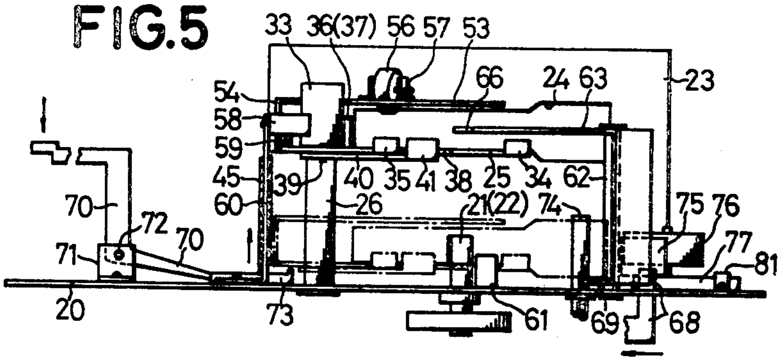
FIGURE 5 is a left hand side view showing the device of FIGURE 4.
Figure 6:
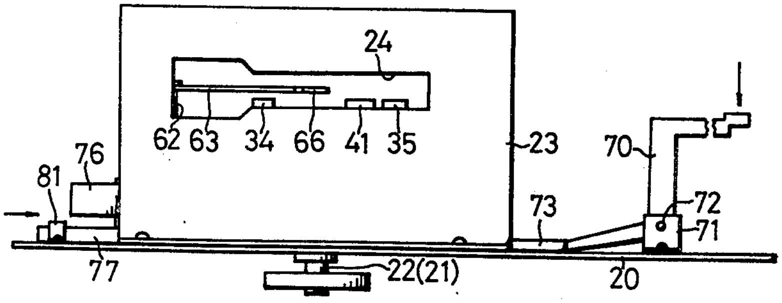
FIGURE 6 is a right hand side view showing the device of FIGURE 4.

Referring to FIGURES 1 to 4, a tape magazine to be loaded in the device according to this invention is generally indicated by the reference numeral 1. Such tape magazine is well known in the art, and therefore the construction thereof will be simply described. The tape magazine 1 includes a casing 2 accommodating a pair of reels 3 and 4 between which a tape 5 extends. The reels 3 and 4 are formed with reel shaft apertures 6 and 7 through which reel shafts are inserted, respectively. Through-apertures 8 and 9 are formed in the top and bottom surfaces of the casing 2, so that the shaft apertures 6 and 7 are exposed at the top and bottom surfaces of the shaft apertures 6 and 7 are exposed at the top and bottom surfaces of the casing through the apertures 8 and 9 respectively. The front face of the casing 2 is open and the tape 5 is guided while being exposed through the open front face of the casing. The reference numeral 10 represents guide members. A capstan inserting aperture 11 is formed in the top and bottom surfaces of the casing 2 in such a manner as to penetrate therethrough at a position where a capstan is disposed in opposing relationship to the back surface of the magnetic tape 5, so that the latter may be transported by means of the capstan projecting out of the base plate of the device and a pinch roller cooperating with the capstan.

Figure 4:
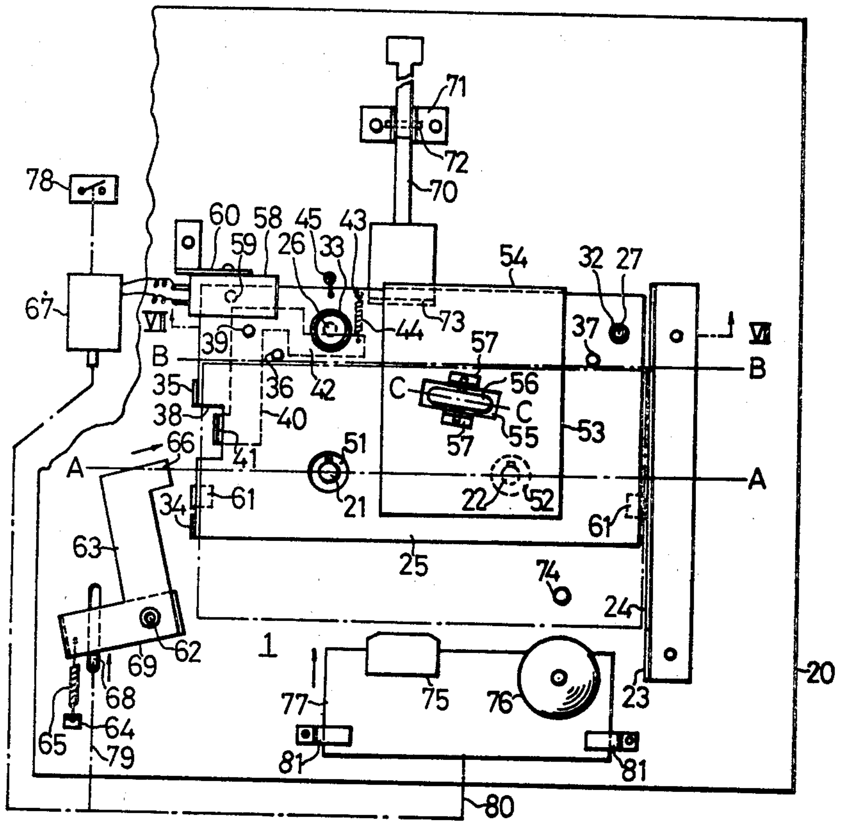
FIGURE 4 is a plan view showing the tape magazine loading device according to an embodiment of the present invention.

In the foregoing, description has been made of an example of tape magazine to be inserted in the device embodying the present invention. With reference to FIGURE 4, description will now be made of the device according to an embodiment of the present invention.

Figure 7:
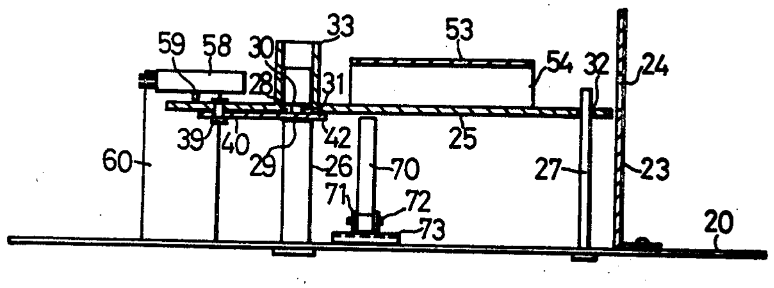
FIGURE 7 is a sectional view taken along line VII—VII of FIGURE 4.

The reference numeral 20 represents a base plate on which are provided a pair of reel shafts 21 and 22 which are connected with a drive mechanism (not shown) provided below the base plate. A plate 23 is attached to the base plate on the right hand side of the reel shaft 22 in such a manner as to vertically extend substantially at right angles with respect to a line A—A passing through the reel shafts 21 and 22, and the plate 23 is formed with a window 24 for guiding the tape magazine 1. A guide-retainer shaft 26 and guide shaft 27 are provided on the base plate 20 in back of the reel shafts 21 and 22 in such a manner as to substantially vertically extend from the surface of the base plate and in predetermined spaced relationship to each other. The guide-retainer shaft 26 is adapted to guide a slide plate 25 and retain it at an upper position, and the guide shaft 27 is adapted to upwardly or downwardly guide the slide plate 25 in cooperation with the guide-retainer shaft 26. As shown in FIGURE 7, the guide-retainer shaft 26 is formed with a notched groove 28 and provided with upper and lower flange surfaces 29 and 30.

The slide plate 25 is formed with through-apertures 31 and 32 through which the guide-retainer shaft 26 and guide shaft 27 are loosely inserted. Stopper pieces 34 and 35 adapted for engagement with the left hand side surface of the tape magazine 1 are provided on the left hand side edge of the slide plate 25 at the front and rear positions. Further, guide members 36 and 37 are provided on the slide plate 25 in such a manner that the outer faces of these guide members are located on a line B—B extending through the rear edge of the window 24 of the plate 23 substantially in parallel with the line A—A.

A notched portion 38 is formed at the center of the left hand side edge portion of the slide plate 25 in such a manner as to extend to the right. A shaft 39 is provided on the slide plate 25 at the left rear position, and an arm 40 is rotatably attached to the shaft 39 in such a manner as to extend along the bottom surface of the slide plate 25 so that one free end 41 of the arm is projected out of the top surface of the slide plate 25 through the notched portion 38 so as to be brought into engagement with the left hand side surface of the magazine 1. The other free end of the arm 40 is made to extend into the notched groove 28 of the guide-retainer shaft 26. The axial thickness of the free end 41 in the notched groove 28 is made smaller than that of the notched groove 28. A spring 44 is interposed between the arm 40 and a retainer 43 provided on the slide plate 25, whereby the free end 42 of the arm 40 is normally located in the notched groove 28. Thus, the slide plate 25 is normally made to rest on the arm 40 so as to be maintained at an upper position, with the upper surface thereof at substantially the same level as the lower edge of the window 24 of the plate 23, while the lower surface of the free end 42 of the arm 40 is disposed in abutment with the lower flange surface 29 of the notched groove 28.

A plate 53 extends in opposing relationship to the top surface of the slide plate 25, and it is supported by a plate 54 extending from the rear edge of the slide plate 25. The plate 53 is formed with a through-aperture 55, and a rotary member 56 is inserted in the through-aperture 55 from the above. The rotary member 56 is adapted to rotate in a plane including a line C—C slightly turned clockwise with respect to the line A—A or B—B. The outer peripheral surface of the rotary member 56 is slightly projected from the bottom surface of the plate 53 to the side of the slide plate 25.

A microswitch 58 is carried by a vertically extending support member 60 attached to the base plate 20 so that it is disposed in close opposing relationship to the top surface of the slide plate 25 while the latter is being maintained at the upper position, and a contact 59 thereof is electrically closed by being engaged by the slide plate 25 when the latter is moved slightly above the normal upper position thereof.

A spring 45 is interposed between the slide plate 25 at a position preferably in the neighborhood of the guide-retainer shaft 26 and the base plate 20. Thus, if the arm 40 is rotated with the free end 42 thereof against the spring 44, then the free end 42 is enabled to escape from the notched groove 28 so that the slide plate 25 is automatically slid downwardly.

The slide plate 25 has through-apertures 51 and 52 through which the reel shafts 21 and 22 are inserted respectively when the slide plate 25 is slid downwardly, so that the slide plate 25 is maintained at the lower position, with the reel shafts 21 and 22 inserted through the apertures 51 and 52 respectively. The reference numeral 61 represents stopper members provided on the base plate 20 to determine the lower position of the slide plate 25.

The base plate 20 is provided with a shaft 62 to which a lever 63 is rotatably attached in such a manner that the free end of the lever is made to extend over the top surface of the slide plate 25 when the latter assumes the upper position. A spring 65 is interposed between the lever 63 and a retainer piece 64 attached to the base plate 20, whereby the free end 66 of the lever 63 is normally kept at a position apart from the top surface of the slide plate 25. The lever 63 is provided with a lower plate-like portion 69 which is disposed in engagement with a lever 68 coupled to a plunger mechanism 67 energized upon closure of the contact 59 of the microswitch 58 through a coupling mechanism indicated at 79. Thus, the lever 63 is rotated against the spring 65 through the operation of the plunger mechanism 67.

In order to be able to move the slide plate 25 from the lower position to the upper position, a lever 70 which is associated with, for example, a plunger mechanism is rotatably attached to a support 71 provided on the base plate 20 through a shaft 72, and a free end 73 of the lever 70 extends below the bottom surface of the slide plate 25 assuming the lower position. Thus, the slide plate 25 is upwardly slid while being guided by means of the guide-retainer shaft 26 and guide shaft 27 through the rotation of the lever 70. In this way, the slide plate 25 is slid until it is brought into engagement with the contact 59 of the microswitch 58 to close the contact.

A capstan 74 is provided on the base plate 20 at the front position, and it is connected with a suitable rotating means below the base plate. Further, a forwardly and backwardly slidable plate 77 provided with a magnetic head 75 and a pinch roller 76 is mounted in front of the capstan 74 in such a manner that it can be slid forwardly and backwardly while being guided by a guide member 81. The forward and backward sliding motions of the slide plate 77 can be effected by the fact that it is connected, for example, with the aforementioned plunger mechanism 67 energized upon closure of an operating switch 78 through a coupling mechanism indicated at 80.

From the foregoing description, the arrangement of the device embodying the present invention has become apparent. Description will now be made of the operation of the device. The tape magazine 1 described above with reference to FIGURES 1 to 3 is placed on the side plate 25 through the window 24 of the plate 23 from the right as viewed in FIGURE 4. In this case, the magazine 1 is brought on the slide plate 25 with the upper surface of the case 2 being disposed in contact with the rotary member 56. Thus, the back surface of the case 2 is positively guided by the guide members 37 and 36 so that the tape magazine 1 can be accurately placed at a predetermined position on the slide plate 25. Then, the left hand side surface of the case 2 of the magazine 1 is disposed into abutment with the free end 41 of the arm 40 to turn the latter so that the other free end 42 is made to escape from the notched groove 28, with a result that the slide plate 25 is lowered by means of the spring 45 while being guided by the shafts 26 and 27. In this case, the magazine 1 is restrained so as to be prevented from unnecessarily projecting to the left by the stoppers 34 and 35 so that it is maintained on the slide plate 25. Thus, the magazine 1 is lowered while resting on the slide plate 25, with the left and right positions thereof being restrained by the stoppers 34 and 35 and the left side surface of the plate 23 and the front and rear positions thereof being restrained by the guide members 36 and 37. This downward movement of the magazine 1 results in the reel shafts 21 and 22 being inserted in the reel shaft apertures 6 and 7 through the through-apertures 8 and 9. Simultaneously, the capstan 74 is inserted in the capstan inserting aperture 11. Then, the slide plate 25 has the bottom surface thereof brought into abutment with a receptacle table 61 so as to assume the normal operational position.

In such state, the switch 78 is closed to energize the plunger mechanism 67, whereby the forwardly and backwardly movable slide plate 77 is backwardly slid so that the magnetic head 75 is placed into engagement of the tape 5 accommodated in the magazine 1 and the pinch roller 76 is disposed into rolling-contact with capstan 74 with the magnetic tape interposed therebetween. Thus, the operating condition can be attained, with the magentic tape 5 being transported from the reel 3 to the reel 4.

In an attempt to take out or unload the magazine 1 after completion of the operation, the switch 78 is opened so that the slide plate 77 is returned to the front position. On the other hand, lever 70 is made to rotate about the shaft 72 so that the slide plate 25 is raised by the free end 73 of the lever 70 while being guided by the shafts 26 and 27. Thus the contact 59 of the microswitch 58 is depressed to be closed by the slide plate 25. Upon closure of the contact 59, the plunger mechanism 67 is energized so that the lever 63 is turned by the lever 68 against the spring 65. Thus, the magazine 1 resting on the slide plate 25 has the left side surface of the case 2 thereof depressed to the right by the free end 66 of the lever 63. In this case, the magazine 1 corresponds in position to the window 24 of the plate 23. Thus, the magazine 1 is pushed out to the right through the window 24. When the magazine 1 is thus pushed out, the free end 41 of the arm 40 is disposed out of engagement with the magazine 1, so that the arm 40 is turned with the aid of the spring 44 so as to have the other free end 42 disposed in the notched groove 28. In this way, the slide plate 25 is maintained at the normal upper position.

As descrbed above, in accordance with the present invention, the magazine is automatically brought to the predetermined operational position so that the tape can be transported in engagement with the magnetic head, merely by placing the magazine in parallel relationship to the base plate without requiring any prior or subsequent operation. Thus, the loading of the magazine can be greatly facilitated. In addition, the magazine thus loaded can also be automatically and easily unloaded or taken out.

Although this invention has been described and illustrated in detail, it is to be understood that the same is by way of explanation and example only and is not taken by way of limitation, the spirit and scope of this invention being limited only by the terms of the appended claim.

What is claimed is:

1. A tape magazine loading device, comprising an upwardly and downwardly movable slide plate adapted for upward and downward movement above a base plate, said slide plate being provided with a retainer means for retaining said slide plate at an upper position, guide means provided with a window, said guide means being adapted for guiding a tape magazine onto said slide plate in substantially parallel relationship to said base plate while said slide plate is being maintained at said upper position, means for releasing said slide plate from being retained at the upper position by said retainer means and causing the slide plate to be slid down to a lower position to bring said tape magazine to an operational position after said tape magazine has been placed on said slide plate at a predetermined position, means for raising said slide plate from the lower position, and means including switch means adapted to be actuated by being engaged with said slide plate when said slide plate is raised to a predetermined position by said slide plate raising means, thereby pushing said tape magazine to the outside.

References Cited

UNITED STATES PATENTS

| | | | |
|---|---|---|---|
| 2,969,929 | 1/1961 | Rudzitis | 242—55.13 |
| 3,146,316 | 8/1964 | Knoth | 179—100.2 |
| 3,385,534 | 5/1968 | Staar | 242—55.13 |
| 3,417,938 | 12/1968 | Markakis et al. | 242—55.13 |
| 3,432,169 | 3/1969 | Schroder | 274—4 |

LEONARD D. CHRISTIAN, Primary Examiner

U.S. Cl. X.R.

226—188; 274—11